United States Patent [19]

Kroon

[11] Patent Number: 6,121,439

[45] Date of Patent: Sep. 19, 2000

[54] WATERBORNE COATINGS WITH CATIONICALLY MODIFIED ASSOCIATIVE ETHERS

[75] Inventor: Gijsbert Kroon, BW Hardinxveld Giessendam, Netherlands

[73] Assignee: Hercules Incorporated, Wilmington, Del.

[21] Appl. No.: 09/128,632

[22] Filed: Jul. 27, 1998

[51] Int. Cl.[7] .......................... C08B 11/00; C08B 11/193; C08B 31/05
[52] U.S. Cl. .................. 536/43; 536/44; 536/50; 524/42; 524/43; 524/44; 524/45; 524/46; 524/50; 524/55
[58] Field of Search ................. 536/18.7, 43, 44, 536/50; 524/42, 43, 44, 45, 46, 50, 55

[56] References Cited

U.S. PATENT DOCUMENTS 4,663,159  5/1987  Brode, II et al. .................... 424/70.13
5,473,059  12/1995  Yeh ........................................ 536/18.7

*Primary Examiner*—Nathan M. Nutter
*Attorney, Agent, or Firm*—David Edwards

[57] ABSTRACT

A coating composition is composed of a water-soluble polysaccharide composition comprising at least one hydrophobic group selected from aryl, alkyl, alkenyl, aralkyl and mixtures thereof and at least one quaternary ammonium salt group, both connected to a polysaccharide backbone by covalent bonds. This coating is used for improving the leveling of waterborne paints.

30 Claims, No Drawings

WATERBORNE COATINGS WITH CATIONICALLY MODIFIED ASSOCIATIVE ETHERS

This invention relates to the use of cationically modified associative cellulose ethers as rheology modifiers for waterborne coatings, and more particularly, the use of such cellulose ethers having a quaternary nitrogen-containing cationic moiety and a hydrophobic moiety attached to the backbone of the cellulose ether for improving the leveling in waterborne paints.

BACKGROUND OF THE INVENTION

Cellulose ethers have been used widely in the paint industry as thickeners for emulsion paints. Although these products like hydroxyethyl cellulose, methylcellulose derivatives, ethylhydroxyethyl cellulose and carboxymethyl-cellulose provide the paints with a number of good paint properties, these materials demonstrate shortcomings in the area of rheology. The quality of paints has constantly improved over the last decade with the demand for improving flow, film build, and spatter resistance also increasing.

Associative cellulose ethers were developed to meet this increase in demand for paints with better performance properties. Associative thickeners like hydrophobically modified ethoxylated urethanes (HEURS) were not able to be used as single thickener in medium to high pigmented latex paints because the amount of binder present in these paints is relatively low. Associative thickeners like hydrophobically modified hydroxyethylcellulose (HMHEC) were developed by Aqualon Company, a division of Hercules Incorporated, for use primarily in the paint industry. These HMHEC products are marketed commercially under the trademark Natrosol Plus® and perform extremely well as compared to those prepared with other well known cellulosic polymers for improving flow, film build, and spatter resistance in paints. These Natrosol Plus products, on the other hand, thickens the paint by dual mechanism, i.e., water phase thickening and network formation through hydrophobic interactions, and can, therefore, be used as a single thickener. These Natrosol Plus® products are hydrophobically modified cellulose ether derivatives modified with long chain alkyl groups described by Landoll in U.S. Pat. No. 4,228,277 and 4,352,916. Other patents that describe different hydrophobically modified cellulose ethers useful in paints are U.S. Pat. No. 4,902,733 (Angerer) and U.S. Pat. No. 5,124,445 and 5,120,838 (Just et al). Notwithstanding, this product's major use is in medium to high pigmented paints (i.e., paints with a pigment volume concentration (PVC) of greater than 40%).

The marketplace is still demanding a new generation of products with increased thickening efficiency and film build properties. The instant invention addresses this need by introducing an additional thickening mechanism to the thickening efficiency of Natrosol Plus products; it has been found that ionically modified hydrophobically modified hydroxyethyl cellulose ethers using a quaternary nitrogen-containing cationic moiety can improve the efficiency of all waterborne paints.

Water-soluble quaternary nitrogen-containing cellulose ethers have been described in U.S. Pat. No. 3,472,840 (Stone et al) that are useful in a variety of applications. U.S. Pat. No. 4,663,159 also describes a water-soluble, cationic polysaccharide, including quaternary nitrogen-containing cellulose ethers, containing a hydrophobic substitution that provide aqueous solutions having enhanced viscosity, foaming and preferably improved surface properties; these cationic polysaccharides are useful in personal care, emulsion, and cleanser products.

SUMMARY OF THE INVENTION

The present invention is directed to a coating composition comprising as a thickener a water soluble cellulose ether comprising at least one hydrophobic group selected from the group consisting of aryl, alkyl, alkenyl and aralkyl and at least one quaternary ammonium salt, both connected to a cellulosic backbone by covalent bonds.

DETAILED DESCRIPTION OF THE INVENTION

It has been found that water-soluble, hydrophobically modified cellulose ethers further modified to contain cationic groups separate from the hydrophobic groups on the backbone of the cellulose ethers will provide an additional thickening mechanism that improves the high shear viscosity of water-borne coatings.

The cationic ether modified, hydrophobically modified cellulose ether of the present invention may be produced from readily available materials. Such cellulose ethers are first alkylated with a long chain alkyl compound which are then quaternized with a nitrogen-containing compound. The hydrophobe and nitrogen containing compounds are separately attached to the backbone cellulose ether.

The starting materials of the instant invention include water-soluble polysaccharides such as cellulose ethers such as hydroxyethylcellulose (EHEC), ethyl hydroxyethylcellulose (HEC), hydroxypropylmethyl cellulose (HPMC), methyl cellulose (MC), hydroxypropylmethyl cellulose (HPMC), and methyl hydroxyethyl cellulose (MHEC), hydroxyethylmethylcellulose (HEMC), hydroxyethylcarboxymethylcellulose (HECMC), and guar and guar derivatives and the like. A particularly preferred cellulose ether starting material is hydroxyethylcellulose. The polysaccharide or polygalactomannan starting material of this invention should possess a degree of polymerization (DP) generally of at least about 500, preferably greater than 750, and more preferably greater than 1000. The DP of the starting materials may be controlled through controlled degradation procedures known in the art.

The cationic alkyl modified, hydrophobically modified polysaccharide (such as a cellulose ether) of the instant invention is generally prepared through a sequence of reactions which are known in the prior art. A cellulose ether such as hydroxyethylcellulose is first reacted with a hydrophobic moiety such as cetylglycidylether to form the hydrophobically modified cellulose ether. This reaction should be conducted so that the hydrophobe content is high such as with a content of greater than about 0.6 weight percent, preferably at least 0.8 weight percent, and more preferably at least 1.0 weight percent. It should be noted that the amount of the hydrophobe modification alone does not provide improved leveling in paints (see table 3 on page 7, infra). Notwithstanding, it is essential to provide a suitable hydrophobe modified precursor. This high content hydrophobically modified cellulose ether is then reacted in a separate reaction with a quaternary ammonium salt such as glycidyltrimethyl ammonium chloride in order to add the cationic moiety to the backbone of the hydrophobically modified cellulose ether. In this step, a sufficient amount of the cationic moiety is added to the backbone cellulose ether to improve the amount of leveling of the water-borne paints above the amount of unmodified cellulose ethers. Typically, the amount of cationic degree of substitution (DS) should have a lower limit of 0.005, preferably a lower limit of 0.05, and more preferably a lower limit of 0.07. The upper limit of the cationic DS should be 0.5, preferably 0.25, and more preferably 0.22.

The hydrophobe moieties of the present invention are hydrocarbons of alkyl, aryl, alkenyl, or aralkyl groups having at least 10 carbon atoms, preferably at least about 13 carbons, and more preferably at least 16 carbons in the alkyl chain. The upper limit of the carbon atoms of the hydrocarbon moiety is 24 carbon atoms, preferably 20 carbons, and more preferably 18 carbons. The hydrocarbon containing hydrophobe may be unsubstituted, i.e., simply a long chain alkyl group, or substituted with non reactive groups such as aromatics, i.e., and aralkyl groups. Typical alkylating agents reactive with the cellulose ether hydroxyl groups include halides, epoxides, isocyanates, carboxylic acids, or acid halides.

The cellulose ethers are provided with the quaternary nitrogen-containing substitutents through quaternization reactions that may be achieved by reacting the polysaccharides with quaternizing agents which are quaternary ammonium salts, including mixtures thereof, to effect substitution of the polysaccharide with quaternary nitrogen containing groups on the backbone. Typical quaternary ammonium salts that can be used include quaternary nitrogen containing halides, halohydrins, and epoxides. Examples of the quaternary ammonium salts include one or more of the following: 3chloro-2-hydroxypropyl dimethyldodecyl ammonium chloride; 3-chloro-2-hydroxypropyl dimethyloctadecyl ammonium chloride; 3-chloro-2-hydroxypropyl dimethyloctyl ammonium chloride; 3-chloro-2-hydroxypropyl trimethyl ammonium chloride; 2 chloroethyl trimethyl ammonium chloride; 2,3-epoxypropyl trimethyl ammonium chloride; and the like. Preferred quaternization agents include 3-chloro-2 hydroxypropyl trimethyl ammonium chloride; 3-chloro-2-hydroxypropyl dimethyloctadecyl ammonium chloride; 3-chloro-2-hydroxypropyl dimethyltetradecyl ammonium chloride; 3-chloro-2-hydroxypropyl dimethylhexadecyl ammonium chloride; 3-chloro-2-hydroxypropyl dimethyldodecyl ammonium chloride; and 3-chloro-2 hydroxypropyl dimethyloctadecyl ammonium chloride.

Quaternization can also be achieved using a two-step syntheses of (1) aminating the polysaccharide by reaction with an aminating agent, such as an amine halide, halohydrin or epoxide, followed by (2) quaternizing the product of step (1) by reaction with quaternizing agent, or mixtures thereof, containing a functioning group which forms a salt with the amine. Preferred quaternizing agents include hydrophobe containing long chain alkyl halides, including alkylating agent halides such as dodecyl bromide or octadecyl chloride.

The coating composition of the present invention is a latex-based paint that has a lower limit of the pigment volume concentration (PVC) of 10%. The upper limit of the PVC is 90%.

In accordance with the present invention, a broad range of paint systems (i.e., gloss, semi-gloss and flat) can be thickened with the cationically modified, hydrophobically modified cellulose ether of the present invention. The broad scope of this invention will be illustrated in the following examples with a cationically modified hydrophobically modified hydroxyethylcellulose (CATHMHEC). The process of making these cationically modified associative thickeners was as follows: the associative thickener such as HMHEC was slurried in acetone in the presence of water and caustic. The cationic reagent glycidyltrimethylammonium chloride (GTMAC) was added to the slurry and the reaction mass was heated to a temperature of about 45° C. for about 4 hours under a nitrogen blanket. After the reaction was completed, the reaction mass was cooled down to room temperature and neutralized. The salts were then washed out of the product in a water acetone mixture. Then, the product was dried and ready for use.

EXAMPLE A

This Example demonstrates the instance where the hydrophobe content of the HMHEC is too low (at 0.6 wt. %) in a CATHMHEC so that the cationic modification does not yield a product with good performance in paints. A GTMAC-modified (C16-modified) hydroxyethyl cellulose was evaluated in a gloss emulsion paint based on Prima® HG74 D product, a modified acrylic emulsion, marketed by Rohm and Haas. The formulation of the gloss emulsion paint is given below in Table 1 and the results of the evaluation are set forth in Table 2.

TABLE 1

|  | Parts by weight |
|---|---|
| Water | 49.7 |
| Sodiumhexamethaphosphate | 2.0 |
| Polymeric dispersant - BYK$^c$ 154 | 1.0 |
| Preservative - Mergal ® K6N$^a$ | 1.0 |
| Defoamer - Agitan ® 280$^b$ | 2.0 |
| Thickener | By demand |
| Titanium dioxide | 210.9 |
| Primal HG74D | 650.0 |
| Propylene glycol | 10.0 |
| Texanol ® coalescing agent$^d$, solvent | 15.0 |
| Water | 58.4 |
|  | 1000.0 |

$^a$)Marketed by Riedel de Haen, Germany
$^b$)Marketed by Munching Chemie, Germany
$^c$)Marketed by BYK
$^d$)Marketed by Eastman Co.

TABLE 2

| Example | GTMAC-DS | Thickener* (wt %) | Stormer Viscosity (KU) | ICI-Viscosity (mPas) | Leveling** |
|---|---|---|---|---|---|
| HMHEC*** | — | 0.29 | 101 | 90 | 4 |
| HMHEC | 0.036 | 0.38 | 103 | 90 | 5–6 |
| HMHEC | 0.07 | 0.38 | 102 | 100 | 6 |
| HMHEC | 0.20 | 0.40 | 100 | 90 | 5–6 |
| HMHEC | 0.29 | 0.46 | 104 | 100 | 6 |

*Amount of thickener required for a stormer viscosity of approx. 100 KU.
**Leneta draw down method; rating 1–10; 10 = best.
***Cetylglycidylether modified hydroxyethyl cellulose; 0.6 wt % weight average molecular weight: ~300,000 Dalton.

It appeared that the hydrophobe modification was too low for good flow properties with the CATHMHEC®.

EXAMPLE 1

The hydrophobe substitution of Example A was increased to 1.3–2.0 wt % C16. At this high hydrophobe substitution the HMHEC was modified with different CTMAC-levels, i.e., CTMA-DS between 0.078 and 0.320. The following Table 3 shows the composition of the CATHMHECs and the results of the evaluation of these materials in a flat emulsion paint (PVC 65%) based on Mowilith® DM21 product, a vinyl acetateversatate co-polymer emulsion, marketed by Hoechst Chemical Co.

TABLE 3

Paint evaluation results with CATHMHECs with high hydrophobe substitution in a flat paint based on Mowilith DM21.

| Sample | % C16 | GTMA-DS | Thickener (wt %) | ICI-Viscosity (mPas) | Leveling | Spatter |
|---|---|---|---|---|---|---|
| HMHEC1 | 0.6 | — | 0.53 | 100 | 2 | 7 |
| HMHEC2 | 1.3 | — | 0.46 | 60 | 2 | 5 |
| CATHMHEC0 | 0.6 | 0.200 | 0.58 | 100 | 2 | 7 |
| CATHMHEC1 | 1.3 | 0.078 | 0.36 | 70 | 8 | 7 |
| CATHMHEC2 | 1.3 | 0.163 | 0.37 | 70 | 9 | 5–6 |
| CATHMHEC3 | 1.3 | 0.22 | 0.42 | 70 | 7 | 5 |
| CATHMHEC4 | 1.5 | 0.231 | 0.48 | 70 | 4 | 5 |
| CATHMHEC5 | 2.0 | 0.32 | 0.45 | 60 | 4 | 4 |

These results demonstrate that a narrow range of hydrophobe substitution and cationic modification level provide the flat paint with excellent leveling ratings. Excellent leveling for a flat paint means a rating of 7 and higher.

EXAMPLE 2

Thickening efficiency of CATHMHEC is also superior over a commercial grade HMHEC1. The lower ICI-viscosity of the paints containing the CATHMHECs can be corrected to the desired viscosity by combining the CATHMHECs with synthetic thickeners of a hydrophobe end-capped polyethyleneoxide (HMPEO), an associative acrylic thickener like Primal RM5 product or a hydrophobically modified ethoxylated urethane (HEUR) like Primal RM8 or Primal RM1020 product (all of the Primal products are marketed by Rohm and Haas.) The formulation of the flat emulsion paint with a PVC of 65% is given below in Table 4 and the ICI and leveling results are set forth in Table 5.

TABLE 4

Flat emulsion paint (PVC 65%) based on Mowilith ® DM21.

| | Parts by Weight |
|---|---|
| Water | 197 |
| Sodiumhexamethaphosphate | 1 |
| Poly acrylic acid, ammonium salt | 2 |
| Preservative Mergal ® K6N[a] | 2 |
| Defoamer Agitan 280[b] | 1 |
| TiO2 | 159 |
| Calcium carbonate | 273 |
| Talc | 23 |
| Mowilith DM21[c] | 167 |
| Propylene glycol | 15 |
| Texanol[d] | 4 |
| Defoamer[e] | 1 |
| Water + thickener | 155 |
| | 1000 |

[a]Marketed by Riedel de Haen, Germany
[b]Marketed by Munching Chemie, Germany
[c]Vinylacetate VeoVA latex, marketed by Hoechst Co.
[d]Coalescing agent, solvent marketed by Eastman Co.
[e]Agitan 280, marketed by Munching Chemie, Germany

TABLE 5

| Sample | Thickener (wt %) | ICI visc. (mPas) | Leveling |
|---|---|---|---|
| CATHMHEC1 | 0.36 | 70 | 8 |
| CATHMHEC1 | 0.18 | 160 | 8 |
| Primal ® RM8[a] | 0.36 | | |
| CATHMHEC1 | 0.27 | 150 | 10 |
| HMPEO 0685-5 | 0.27 | | |
| CATHMHEC2 | 0.19 | 200 | 6 |
| Primal ® RM1020 | 1.2 | | |

[a]Urethane-based associative thickener marketed by Rohm and Haas Co.

EXAMPLE 3

The good leveling ratings obtained with the CATHMHEC1, 2, and 3 set forth in Table 3 are not restricted to specific paint formulations. This will be demonstrated by using the following two additional paint systems:

(a) Gloss paint (PVC 15%) based on Primal® HG74D product;

(b) Semi-gloss paint based on Uramul® CC280 product.

The formulation of the gloss paint (a) is the same as shown in Table I and the semi-gloss paint formulation (b) is given below in Table 6.

TABLE 6

Semi-gloss paint based on Uramul CC280.

| | Parts by weight |
|---|---|
| Water | 180 |
| Sodiumhexamethaphosphate | 2.5 |
| Polymeric dispersant | 2.5 |
| Preservative - Mergal K6N | 3 |
| Defoamer - Agitan 280 | 2.5 |
| TiO2 | 240 |
| Calcium carbonate | 40 |
| Uramul ® CC280[a] | 500 |
| Propylene glycol | 10 |
| Texanol ® | 15 |
| Water + thickener | 64.5 |
| | 1000 |

[a]Acrylic latex, marketed by DSM resins

The paint evaluation results are summarized in Table 7:

TABLE 7

| Paint | Thickener Type | Thickener (wt %) | Stormer Visco. (KU) | Leveling |
|---|---|---|---|---|
| Gloss | CATHMHEC1 | 0.17 | 89 | 10 |
| | CATHMHEC2 | 0.18 | 97 | 9–10 |
| Semi-gloss | CATHMHEC1 | 0.07 | 93 | 9–10 |
| | CATHMHEC2 | 0.08 | 95 | 10 |

EXAMPLE 4

Other cationically modified hydrophobically modified water-soluble polymers were evaluated in a flat paint with PVC of 65 as set forth in Table 4. The paint evaluation results are summarized in Table 8, infra.

TABLE 8

| Sample | %C16 | GTMA-DS | Thickener (wt %) | ICI-visc. (mPas) | Leveling | Spatter |
|---|---|---|---|---|---|---|
| HMEHEC1* | 0.9 | — | 0.49 | 70 | 2 | 5 |
| CATHMEHEC1*a | 0.9 | 0.152 | 0.41 | 70 | 7 | 6 |
| HMHEGuar** | 1.2 | — | 0.57 | 60 | 1 | 3 |
| CATHMHEGuar**a | 1.2 | 0.146 | 0.49 | 65 | 6 | 5 |
| HMMHEC*** | 1.1 | — | 0.67 | 80 | 3 | 6 |
| CATHMMHEC***a | 1.1 | 0.161 | 0.41 | 60 | 7 | 6 |
| HMHPC**** | 1.1 | — | 0.71 | 85 | 2 | 4 |
| CATHMHPC****a | 1.1 | 0.154 | 0.45 | 70 | 6 | 6 |

*Bermocol EHM 100, a commercial product marketed by AKZO Nobel, which was hydrophocially modified with 0.9 wt % C16 and then cationically modified with GTMAC (see CATHMEHEC,a)
**Basis HEGuar with Mw ~270,000 Dalton was modified with 1.2 wt % C16 and then cationically modified with GTMAC(a)
***Basis MHEC with Mw ~240,000 Dalton with OCH3-DS of 1.43 and with HE- MS of 1.1 was modified with 1.1 wt % C16; then cationically modified with GTMAC(a)
****Basis: HPC with Mw ~250000 Daltons and HP-MS 2.7 was then modified with 1.1 wt % C16 and then cationically modified (a)

What is claimed:

1. A coating composition comprising a water soluble polysaccharide composition comprising at least one hydrophobic group selected from the group consisting of aryl, alkyl, alkenyl, aralkyl and mixtures thereof and at least one quaternary ammonium salt group, both connected to a polysaccharide backbone by covalent bonds, wherein the content of the hydrophobic groups is greater than 0.6 weight percent.

2. The coating composition of claim 1, wherein the hydrophobic group has at least 10 carbons.

3. The coating composition of claim 1, wherein the hydrophobe group has a lower limit of 13 carbons.

4. The coating composition of claim 1, wherein the hydrophobic groups have a lower limit of 16 carbons.

5. The coating composition of claim 1, wherein the hydrophobic group upper limit is 24 carbons.

6. The coating composition of claim 1, wherein the hydrophobic group upper limit is 20 carbons.

7. The coating composition of claim 1, wherein the hydrophobic group upper limit is 18 carbons.

8. The coating composition of claim 1, wherein the at least one quaternary ammonium salt is selected from the group consisting of 3-chloro-2-hydroxypropyl dimethyldodecyl ammonium chloride, 3-chloro-2-hydroxypropyl dimethyloctadecyl ammonium chloride, 3-chloro-2-hydroxypropyl dimethyloctyl ammonium chloride, 3-chloro-2-hydroxpropyl trimethyl ammonium chloride, 2-chloroethyl trimethyl ammonium chloride, glycidyltrimethylammonium chloride, and 2,3-epoxypropyl trimethyl ammonium chloride.

9. The coating composition of claim 8, wherein the at least one quaternary ammonium salt is glycidyltrimethylammonium chloride.

10. The coating composition of claim 1, wherein the polysaccharide backbone is selected from the group consisting of hydroxyethylcellulose (EHEC), ethyl hydroxyethylcellulose (HEC), hydroxypropylmethyl cellulose (HPC), methyl cellulose (MC), hydroxypropylmethyl cellulose (HPMC), methyl hydroxyethyl cellulose (MHEC), hydroxyethylmethylcellulose (HEMC), hydroxyethylcarboxymethylcellulose (HECMC), guar, and guar derivatives.

11. The coating composition of claim 1, wherein the polysaccharide backbone is hydroxyethylcellulose.

12. The coating of claim 1, wherein the content of the hydrophobic groups is greater than 0.8 weight percent.

13. The coating of claim 1, wherein the content of the hydrophobic groups is greater than 1.0 weight percent.

14. The coating of claim 1, wherein the content of the hydrophobic groups has an upper limit of 2.5 weight percent.

15. The coating of claim 1, wherein the quaternary ammonium salt has a degree of substitution of greater than 0.005.

16. The coating of claim 1, wherein the quaternary ammonium salt has a degree of substitution with a lower limit of 0.05.

17. The coating of claim 1, wherein the quaternary ammonium salt has a degree of substitution with a lower limit of 0.07.

18. The coating of claim 1, wherein the quaternary ammonium salt has a degree of substitution with an upper limit of 0.5.

19. The coating of claim 1, wherein the quaternary ammonium salt has a degree of substitution with an upper limit of 0.25.

20. The coating of claim 1, wherein the quaternary ammonium salt has a degree of substitution with an upper limit of 0.22.

21. The coating of claim 1, wherein the polysaccharide backbone starting material has a degree of polymerization of at least about 500.

22. The coating of claim 1, wherein the polysaccharide backbone starting material has a degree of polymerization of greater than 750.

23. The coating of claim 1, wherein the polysaccharide backbone starting material has a degree of polymerization of greater than 1000.

24. The coating composition of claim 1, wherein a synthetic thickener is also present.

25. The coating composition of claim 24, wherein the synthetic thickener is a hydrophobically modified polyethylene oxide.

26. The coating composition of claim 24, wherein the synthetic thickener is an associative acrylic polymer.

27. The coating composition of claim 24, wherein the synthetic thickener is a hydrophobically modified ethoxylated urethane.

28. The coating composition of claim 1, wherein the coating composition is a latex based paint.

29. The coating composition of claim 28, wherein the latex based paint has a pigment volume concentration greater than 10%.

30. The coating composition of claim 29, wherein the upper limit of the pigment volume concentration is 90%.

* * * * *